United States Patent [19]
Metz

[11] 3,766,788
[45] Oct. 23, 1973

[54] RADIAL ROLLER ANTI-FRICTION TRANSMISSION WITH ECCENTRIC BUSHINGS

[75] Inventor: Joseph R. Metz, Ridgefield, Conn.
[73] Assignee: Norco, Inc., Ridgefield, Conn.
[22] Filed: Aug. 23, 1972
[21] Appl. No.: 283,162

[52] U.S. Cl................ 74/441, 74/424.8 R, 74/459, 74/465
[51] Int. Cl. ..... F16h 55/18, F16h 1/18, F16h 55/22
[58] Field of Search............... 74/441, 459, 424.8 R, 74/465

[56] References Cited
UNITED STATES PATENTS
3,296,880  1/1967  Maroth ......................... 74/424.8 R
3,648,535  3/1972  Maroth ......................... 74/424.8 R

*Primary Examiner*—Leonard H. Gerin
*Attorney*—H. Gibner Lehmann et al.

[57] ABSTRACT

A mechanical transmission having an anti-friction nut construction which comprises an annular body member provided with a longitudinal bore to receive a cooperable member in the form of a screw or bar, and with a plurality of roller elements extending radially into the bore for engagement with side wall surfaces of the cooperable member. The body has sockets in which there are eccentric bushing assemblages carrying the roller elements on anti-friction bearings. The assemblages are rotatable in the sockets, and thus the positions of the roller elements can be minutely adjustably shifted laterally. Locking means secure the assemblages against movement once they are properly positioned. The above arrangement enables a given nut to be used with screws or bars of slightly differing tolerances and pitches, since the roller elements can be shifted within limits to accommodate the slight inevitable manufacturing variations. Alternately, the bushing assemblages can be adjusted so the rollers engage opposite side walls of the groove of the screw or bar, and thus backlash can be reduced to zero. The assemblages are easily removable from the body to facilitate servicing and replacement.

17 Claims, 14 Drawing Figures

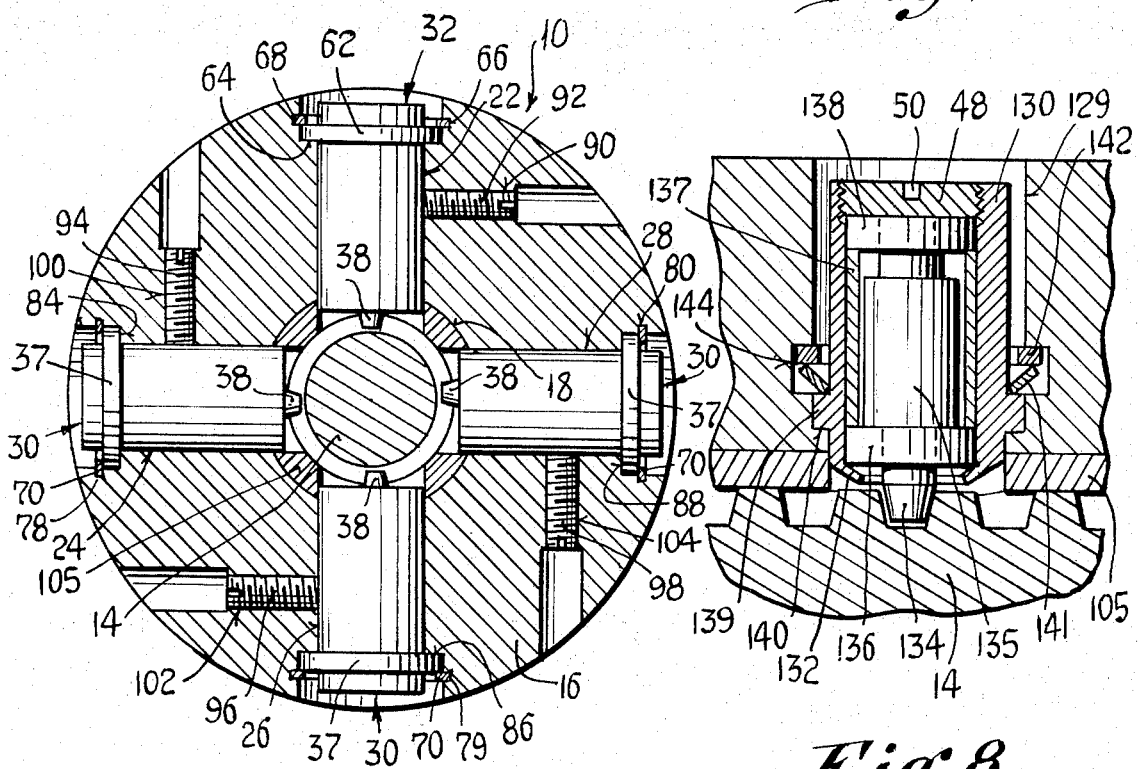
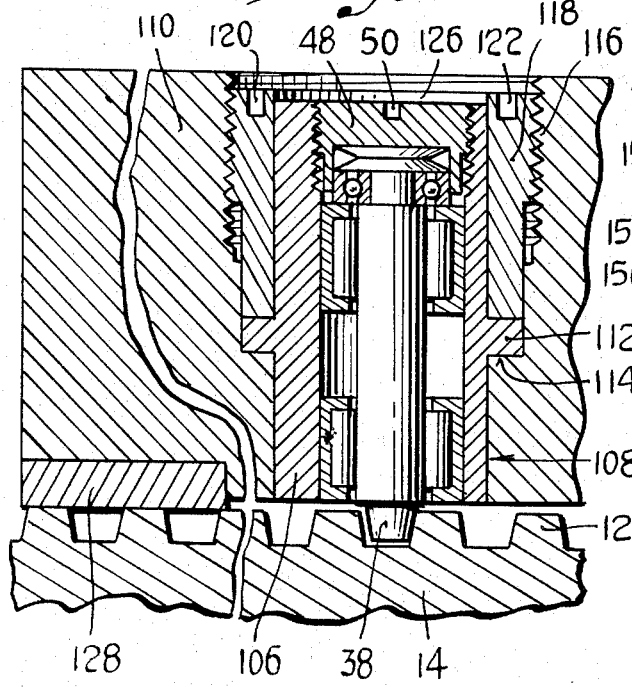
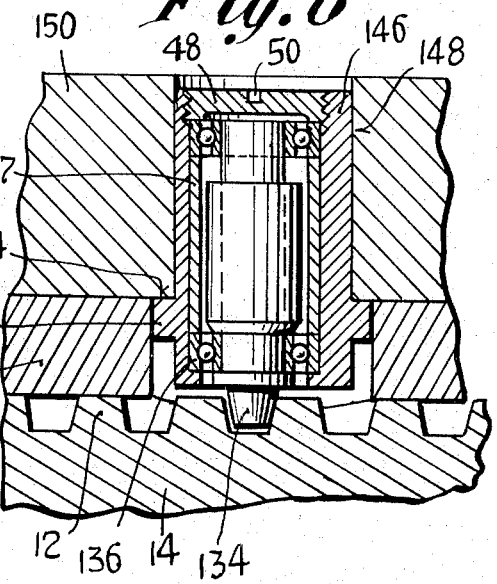

3,766,788

RADIAL ROLLER ANTI-FRICTION TRANSMISSION WITH ECCENTRIC BUSHINGS

BACKGROUND

This invention relates to mechanical transmissions, and more particularly to devices of this type which employ threaded or grooved members such as screws or splined bars. In the past a number of transmission drive arrangements employing threaded or splined members and cooperable devices have been proposed and constructed. In cases where there was substantial contact area between a threaded member and a thread engaging device, both portions had to be constructed to close tolerances to insure that the load distribution over the areas in contact was reasonably uniform to prevent the occurrence of excessive localized stresses and excessive wear. Slight variations in the pitch of threads, from one threaded member to another, frequently resulted in poor efficiency and erratic or unsatisfactory operation, as when a given thread engaging device was used with several different threaded members of varying dimensions. In addition, there was almost always a certain amount of backlash between the threaded member or splined bar and the engaging cooperable device at the time that the two changed direction with respect to one another. In certain critical applications involving precision equipment, even a small amount of backlash could not be tolerated.

SUMMARY

The above drawbacks and disadvantages of prior transmission devices of the type noted are overcome by the present invention which has for an object the provision of a novel anti-friction transmission mechanism involving engagement between rollers on the one hand and projections of a shouldered part or threaded member, which transmission is simple in its construction, reliable in operation, and which virtually reduces backlash to zero. A related object is the provision of a highly efficient transmission device as above noted, wherein the assembly thereof is especially simple so that servicing and maintenance are greatly facilitated. The above objects are accomplished by a novel and unique anti-friction nut comprising an annular body or support member having a longitudinal bore to receive either a threaded member, or a splined bar and having a plurality of roller elements extending radially therein for engagement with side wall surfaces of the member or bar. The support member has radial sockets some of which are adapted to receive a unitary assemblage comprising an eccentric bushing, an anti-friction bearing device carried by the bushing, and a roller element carried by the anti-friction device. The assemblage when inserted into its respective socket is adjustably rotatable therein, and thus the position of the roller element can be adjustably changed axially of the support member or in other directions. Locking means are provided for securing the assemblage in any given rotative position once the proper setting of the associated roller element has been reached. A centralizing ring disposed in the bore of the support member and engaging the surface of the threaded member is also provided to maintain uniform spacing between the latter and the bore walls.

Other features and advantages of the invention will hereinafter appear.

In the drawings, illustrating several embodiments of the invention:

FIG. 3 is a transverse sectional view of the transmission taken on line 3—3 of FIG. 1.

FIG. 6 is a fragmentary sectional view of another embodiment of the invention, particularly illustrating a modified eccentric bushing received in the support member of the transmission and further illustrating alternate means of retaining the bushing in the latter.

FIG. 7 is a view like that of FIG. 6 but illustrating yet another embodiment of the invention comprising a modified eccentric bushing and means for retaining the same.

FIG. 8 is a view like that of FIGS. 6 and 7, illustrating still another embodiment of the invention.

Figure 1:
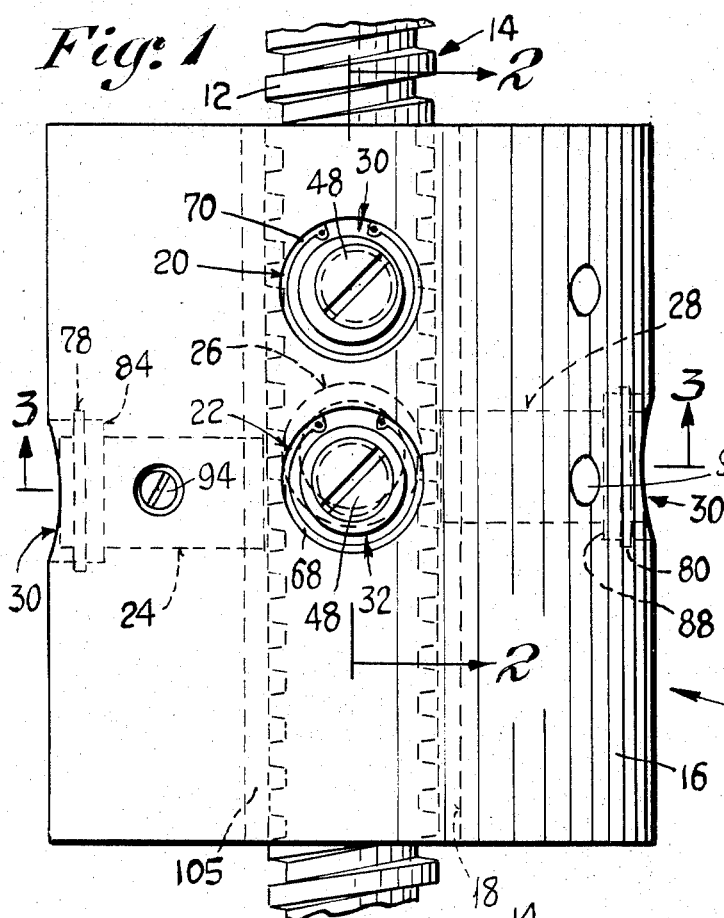
FIG. 1 is a front elevational view of the anti-friction transmission of the present invention, illustrating one embodiment thereof.
Figure 2:
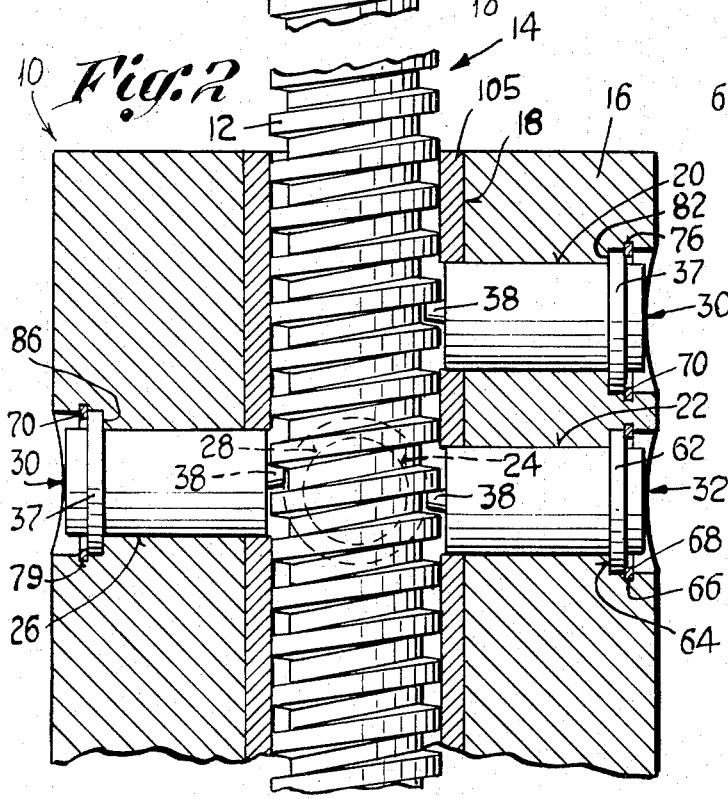
FIG. 2 is a vertical sectional view of the transmission taken on line 2—2 of FIG. 1, particularly illustrating one concentric bushing assemblage and two eccentric bushing assemblages as provided by the invention.

Referring first to FIGS. 1-3 there is illustrated an anti-friction transmission part generally designated by the numeral 10, cooperable with projections or threads 12 of a shouldered part such as a screw 14. The transmission part 10 comprises an annular support member 16 having a bore 18 extending along the projections or threads of the screw 14 and spaced therefrom. As shown in FIGS. 2 and 3, the support member 16 has a plurality of radially disposed sockets 20, 22, 24, 26 and 28 communicating with the bore 18 thereof, each being adapted to receive a bushing assemblage 30 or 32, illustrated respectively in FIGS. 4 and 5. The sockets 20-28 preferably all have substantially the same configuration and size to enable a given bushing assemblage to be received in any particular socket.

Figure 4:
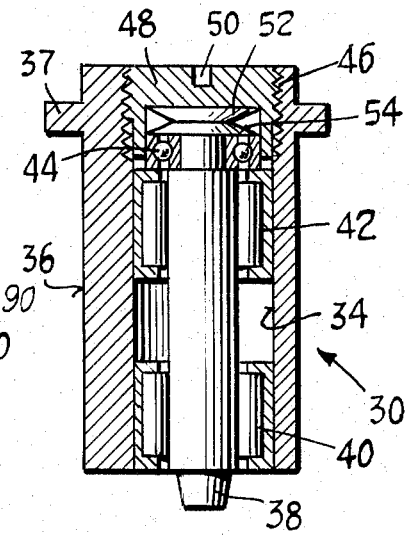
FIG. 4 is a sectional view of one of the eccentric bushings per se of FIG. 2.

In accordance with the present invention the bushing assemblage 30 is of construction, as illustrated in detail in FIG. 4, wherein the bore 34 of the assemblage is eccentric with respect to the outer periphery 36 thereof. The assemblage comprises an annular shoulder 37 disposed on the outer periphery 36, and carries a roller element 38 in anti-friction bearings 40, 42 and 44. The bore 34 of the assemblage is further provided with a threaded portion 46 which receives a threaded cap 48 having a slot or key 50 that can be engaged by a suitable tool such as a screwdriver. Back-to-back spring washers 52 and 54 provide a biasing force against the roller element 38 through the bearing 44 to thereby urge the roller to a normally advanced position with respect to the bushing body. The bearings 40, 42 and 44 can be press fitted onto the roller element to maintain proper positioning therebetween. Before the assembly of the cap 48 to the assemblage 30, a locking or adhesive compound is preferably applied to the cap threads so as to prevent loosening of the cap after the compound has solidified. This enables initial rotational adjustment of the bushing assemblage to be made after it has been inserted into one of the support member sockets, simply by engaging the slot 50 with a suitable tool as will be explained in more detail below. It can be readily seen that the axis of rotation of the roller element 38 is non-coincidental with the axis of rotation of the bushing assemblage 30 in its respective socket. Thus, rotation of the assemblage 30 will give rise to a lateral displacement of the axis of rotation of the roller element 38.

Figure 5:
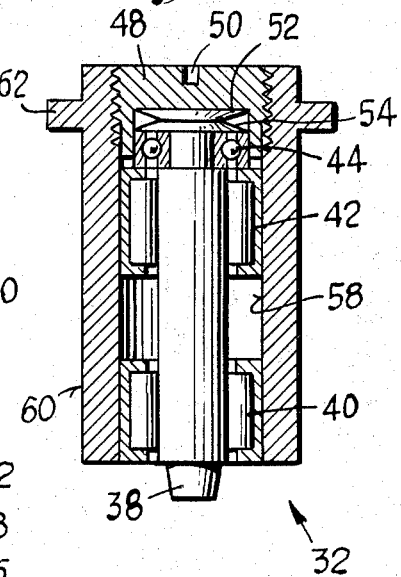
FIG. 5 is a sectional view of the concentric bushing assemblage of FIG. 2.

FIG. 5 illustrates a different or concentric bushing assemblage 32 having a central bore 58 which is concentric with the outer periphery 60. The assemblage carries a roller element 38 in anti-friction bearings 40, 42 and 44. The roller element 38 is secured in place by a threaded cap 48 having a slot 50. The cap 48, when tightened, presses against spring washers 52, 54 which in turn provide a biasing force to the roller element 38 thereby biasing the latter to a normal, advanced position with respect to the bushing body. An annular shoulder 62 is provided to facilitate mounting of the bushings on the support member 16, as will be explained below.

FIGS. 2 and 3 illustrate the details of the mounting of the bushing assemblages 30 and 32. The socket 22 has an annular shoulder 64 which is adapted to abut the annular shoulder 62 of the concentric bushing 32, the bushing being inserted radially inward into the socket to the point where the shoulders abut one another. The socket 22 is also provided with an annular recess 66. With the bushing 32 in place, a split retainer washer 68 can be installed in the recess to thereby retain the bushing in the socket. In a similar manner, the eccentric bushing assemblages 30 are held captive by means of retainer washers 70 which are inserted into recesses 76, 78, 79 and 80 of the sockets 20, 24, 26 and 28 respectively. The annular shoulders 37 of the bushings 30 abut the annular shoulders 82, 84, 86 and 88 respectively of the sockets 20, 24, 26 and 28, as illustrated in FIGS. 2 and 3.

Referring to FIG. 3, in accordance with the present invention, the support member 16 is further provided with a tapped bore 90 communicating with the socket 22, and means carried by the member 16 for locking the bushing 32 against rotation, the means comprising a set screw 92 adapted to engage the exterior surface of the bushing 32. In a similar manner, the bushing assemblages 30 can be locked against rotation by set screws 94, 96 and 98 carried in tapped bores 100, 102 and 104 respectively, communicating with sockets 24, 26 and 28 respectively.

By the present invention there is further provided an annular centralizing ring 105 disposed within the bore 18 of the support member 16. The ring centralizes the screw 14 within the bore and insures uniform engagement of the threads of the screw with the roller elements 38, thus minimizing any tendency toward excessive wear of one roller element due to non-concentricity of the screw and support member.

The operation and advantages of the present invention may now be readily seen. As best illustrated in FIG. 2, the position of the roller element 38 of the concentric bushing 32 is axially fixed and not adjustable. The roller is shown engaging the threads 12 of the screw 14. By the present invention, the positions of the pins 38 carried in the eccentric bushings 30 disposed in the sockets 20 and 26 in FIG. 2 (and in the sockets 24, 26 and 28 in FIG. 3) are movable along an axis parallel to that of the screw, thus enabling compensation for slight variations which occur in the thread pitch from one screw to another. The adjustment of the eccentric bushings can be easily effected. In FIG. 2, the screw can be inserted into the bore 18, such that the roller element 38 of the concentric roller assemblage 32, will engage one wall of the thread groove (depending upon the direction of the load applied to the screw 14). With the eccentric bushings 30 fully inserted in their respective sockets 20 and 26, the screw can be advanced further, and the eccentric bushings 30 rotated in their respective sockets in order that the roller element of each will just engage the same wall of the thread groove. The rotation is easily accomplished by engagement with a suitable tool of the slot 50 of each bushing assemblage. After the proper rotary position of each of the eccentric bushings is achieved, they can be locked into position by means of the corresponding set screws. By the above arrangement, the positions of roller elements can be easily changed to provide improved load distribution and better load sharing between the various roller elements. Slight variations in thread pitch from one screw to another can be easily accommodated by the simple adjustment procedure described above.

It is to be noted that different eccentric bushing assemblages can be employed in the nut simply by loosening the particular set screw, removing the retainer washer and withdrawing the particular bushing assemblage. This operation can be achieved with a minimum of time and effort, thus making replacement of the assemblages extremely easy.

Also, it should be noted that it is desirable to keep the eccentricity of the bushings as small as possible while still maintaining an adequate range for adjustment to enable compensation for the worst case of large screw thread tolerance. By employing a relatively small eccentricity, the likelihood of the eccentric bushing assemblages being inadvertently rotated in their respective sockets by the application of a heavy load applied to the screw is minimized. Such an inadvertent rotation would upset the adjustment of the rollers carried in the eccentric bushings and would have an adverse effect upon the operation of the transmission.

Another embodiment of the invention is illustrated in FIG. 6, wherein an eccentric bushing 106 is shown disposed in a radial socket 108 of the annular portion of a support member or nut 110. The bushing 106 has an annular shoulder 112 which is adapted to abut the corresponding shoulder 114 of the socket 108. In accordance with the present invention the socket 108 has an internally threaded portion 116. There is further provided a hollow screw 118 receivable in the socket, the screw having keying means or slots 120, 122 engageable by a suitable tool for effecting rotation thereof. An access opening 126 of the screw is provided to enable rotary adjustment of the bushing 106. This is accomplished by loosening the screw 118 and engaging the slot 50 of the cap 48 (through the access hole 126) with a suitable tool. Following this adjustment, the screw 118 can be tightened such that the bushing shoulder 112 is tightly clamped between the socket shoulder 114 and the end portion of the screw 118. A centralizing ring 128, disposed at the end portion of the support member 110, functions in a manner similar to the ring 105 in FIG. 2, to centralize the screw 14 with respect to the roller elements 38 carried by the support member.

Yet another embodiment of the invention is illustrated in FIG. 7, showing an eccentric bushing 130 having an inturned end 132 which retains the roller element 134 and bearings 136 and 138. The bushing, roller element and bearings constitute a unitary assemblage insertable in the socket 129 as a single cartridge. The roller element 134 is provided with a sleeve 135 which is press-fitted thereon. The sleeve 135 engages the upper portion of the bearing 136 and thus retains the roller element 134 in the bushing 130. An annular bushing 137 is disposed between the bearings 136 and 138 to maintain proper spacing therebetween. The eccentric bushing 130 is provided with a shoulder 139 which abuts against a corresponding shoulder 140 of the socket. Shoulders 139 and 140 thus constitute positioning means for the assemblage to limit the insertion thereof to a predetermined amount. The bushing 130 is secured by means of a spring washer 141 and a retainer washer 142 which is receivable in a recessed portion 144 of the socket. The spring washer engages the opposite side of the bushing shoulder 139, and thus maintains the latter in engagement with the shoulder 140 of the socket 129. The rotary adjustment of this assemblage can be effected by engagement of a suitable tool with the slot 50 of the bushing cap 48 as above described.

Yet another embodiment of the invention is illustrated in FIG. 8, wherein an eccentric bushing 146 is received in the socket 148 from inside the bore of the support member 150. Under these circumstances the socket 148 can have a substantially smooth cylindrical configuration. An annular shoulder 152 of the bushing closely abuts the shoulder portion 154 of the socket, thus preventing movement of the bushing in a radially outward direction. Following the rotary adjustment of the bushing, the latter can be secured by a set screw arrangement similar to that shown in FIG. 3. The arrangement of the roller element and bearings of the bushing 146 are substantially identical to those of the bushing 130 of FIG. 7. Also, the centralizing ring 156 functions in the same manner as the ring 105 of FIGS. 2 and 7.

Figure 9:
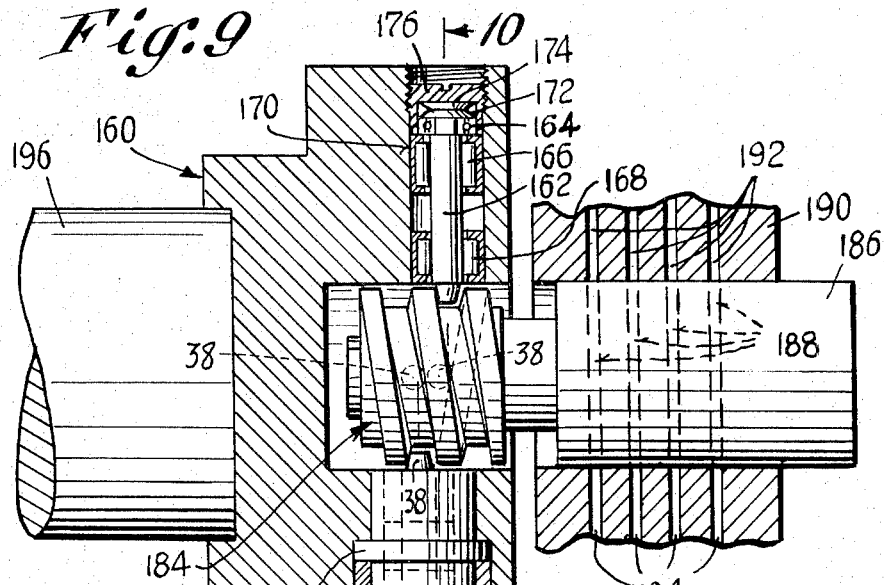
FIG. 9 is a sectional view of yet another embodiment of the invention illustrating a nut having a single roller element carried directly in a radially extending socket thereof, and also adjustable roller elements mounted on eccentric bushings disposed in other sockets of the nut body, and further illustrating a cooperable threaded member connected with and adapted to actuate a valve stem.
Figure 10:
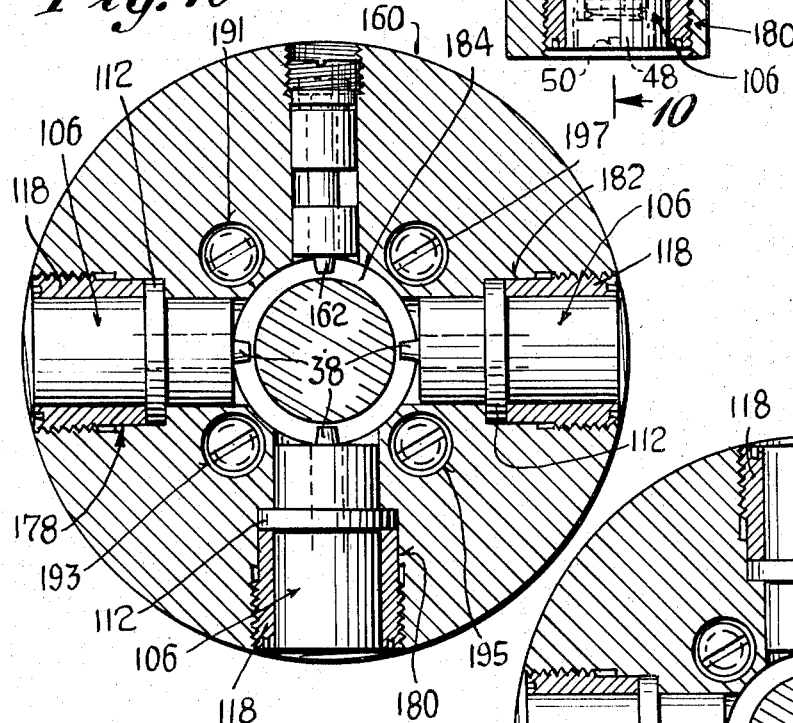
FIG. 10 is a transverse sectional view taken on line 10—10 of FIG. 9.

A typical application for the transmission of the present invention is illustrated in FIGS. 9 and 10 wherein a nut or shouldered part generally designated 160 is provided with a roller element 612 which is fixed in its axial position with respect to the nut. The roller element 162 is carried in anti-friction bearings 164, 166 and 168, the latter being disposed in a radially extending socket 170 of the nut. A pair of back-to-back spring washers 172 and 174 bias the roller element to a normal advanced position with respect to the socket. A threaded cap 17 retains the roller and bearings in the bore. In addition to the roller element 162 the nut has three eccentric bushing assemblages 106 of the kind illustrated in FIG. 6, the assemblages being disposed in radially extending sockets 178, 180 and 182 respectively as illustrated in FIG. 10. The assemblages are retained by means of hollow screws 118 particularly illustrated in FIG. 6, the screws clamping against the respective shoulders 112 thereof.

FIG. 9 illustrates a portion of a screw thread 184 in engagement with the rollers 38 and 162. The screw carries a valve stem 186 having ports 188. The valve stem is received in a valve housing 190 having exit and entry ports 192 and 194, respectively. The nut 160 is connected with a shaft 196 powered by a servo or control motor (not shown) which provides power to rotate the nut for fractional portions of a revolution. The shaft is secured to the nut by means of bolts extending through the mounting holes 191, 193, 195 and 197 of the nut (FIG. 10). In the case where the ports 188 of the valve stem 186 are spaced very close to one another, it can readily be seen that the positioning of the valve stem in the valve housing can become rather critical, since a small axial displacement of the valve stem will give rise to a substantial change in size of the openings for flow. In such a case it is desirable to have nearly zero backlash between the screw 184 (and valve stem 186) and the nut 160. This is readily accomplished by the present invention.

It will be seen that for a given rotary position of the nut 160, the roller element 162 can engage one wall of the groove of the screw 184. Since the oppositely disposed roller 38 (180° from roller 162) is mounted on a bushing assemblage which is eccentric and adjustable, the latter can be rotated (by engagement by a suitable tool with the slot 50 in the cap 48) such that the roller element 38 will engage the opposite wall of the groove of the screw 184. This arrangement provides virtually zero backlash since each roller engages an oppositely facing wall of the groove of the thread. Similarly in FIG. 10, the two rollers 38 which are disposed 90° from the roller 162 can be adjusted so that one will engage one wall of the groove and the other will engage the other wall. As an alternative, for a more balanced arrangement as illustrated in FIG. 9, one pair of diametrically disposed pins can be set to engage one wall of the groove, and the other pair set to engage the opposite wall of the groove. This arrangement has the advantage of not only increased compatability with screws of slightly varying pitches, but also provides a means for reducing backlash to negligible proportions.

Figure 11:
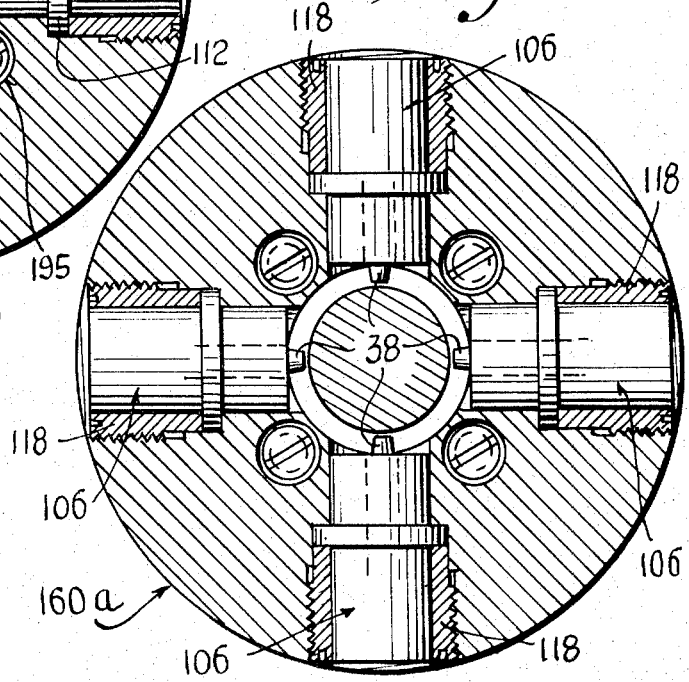
FIG. 11 is a transverse sectional view of still another embodiment of the invention, illustrating a nut having four roller elements mounted on eccentric bushings carried in sockets of the nut body.

A slightly modified nut 160a is illustrated in FIG. 11, wherein the non-eccentric mounted roller 162 of FIGS. 9 and 10 has been replaced by a roller 38 and eccentric bushing assemblage 106 identical to the assemblage illustrated in FIG. 6. By this arrangement the nut carries four eccentric bushing assemblages disposed 90° apart from one another. The adjustment of the assemblages is the same as for the embodiment illustrated in FIGS. 9–10. During adjustment, one of the eccentric assemblages can be set to a mid range or central position, and then the remaining three adjusted for zero backlash as described above.

Other arrangements can be readily devised, subject to the requirement that all roller elements in excess of one must be carried by eccentric bushing assemblages to enable individual adjustment of the second, third, etc., with respect to the non-adjustable roller element.

Figure 13:
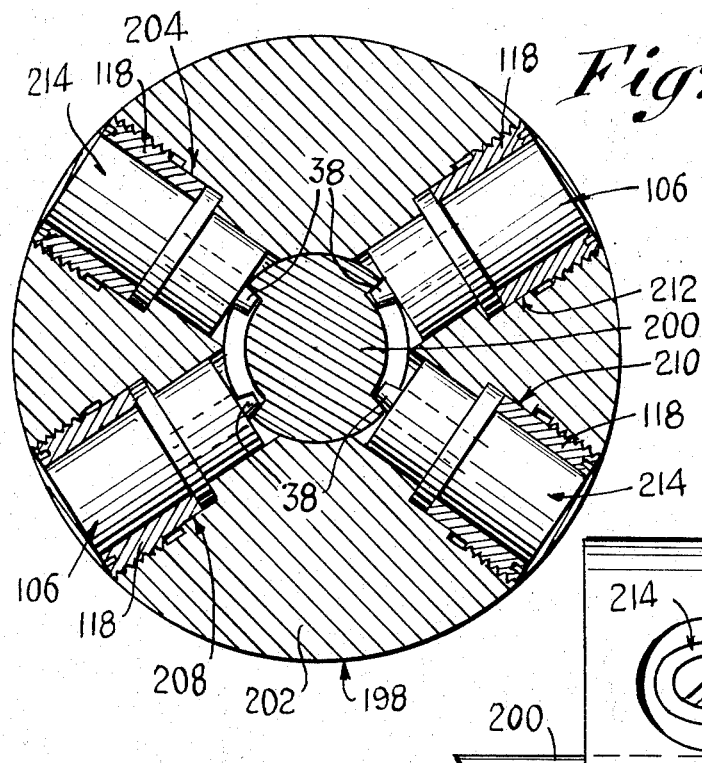
FIG. 13 is a section taken on line 13—13 of FIG. 12.
Figure 12:
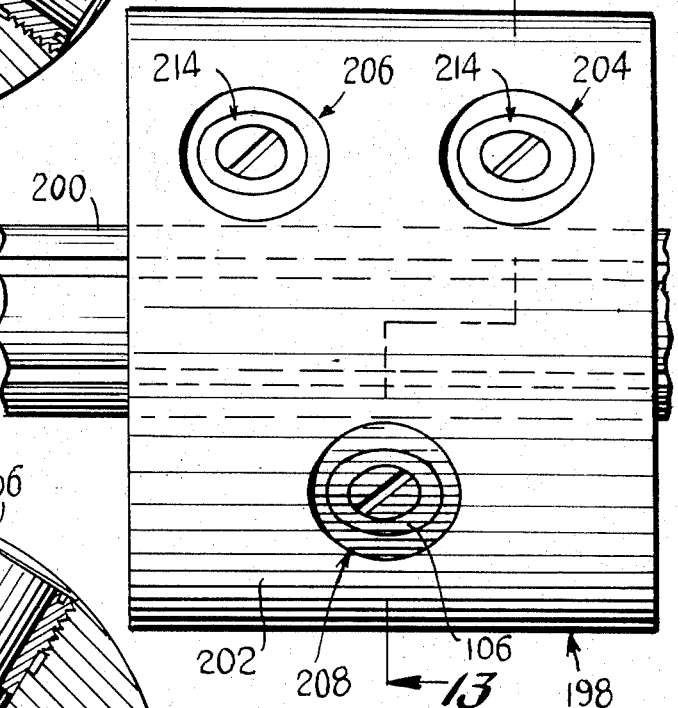
FIG. 12 is a front elevational view of yet another embodiment of the invention showing a slide bearing or guide such as a splined bar having two longitudinally extending grooves.

Another embodiment of the invention is illustrated in FIGS. 12 and 13, illustrating a slide bearing or longitudinal guide 198 for a splined shaft 200. The guide comprises an annular body 202 having radially extending sockets 204, 206, 208 and 210, 212. Received in the sockets 204, 206 and 210 are bushing assemblages 214, identical to that illustrated in FIG. 6 except the assemblages are concentric rather than eccentric. Similarly the sockets 208 and 212 house eccentric bushing assemblages 106 identical to that illustrated in FIG. 6. The assemblages are retained by hollow screws 118 which clamp against the external annular shoulder of the assemblage in the manner illustrated in FIG. 6. By the above arrangement, wherein the side walls of each of the longitudinal grooves of the splined shaft are engaged by two rollers mounted on concentric assemblages and one roller mounted on an eccentric assemblage, virtually all play can be eliminated from the bearing. Adjustment is effected by loosening the hollow screw 116 and engaging the cap 48 of the respective eccentric bushing assemblage 106 with a suitable tool and rotating the same in its socket, thus effecting a circumferential shift in the position of the roller elements carried by the eccentric bushings. As a result, minute variations in the dimensions of the splined shaft can readily be compensated for with a minimum of effort and with no additional machining.

Figure 14:
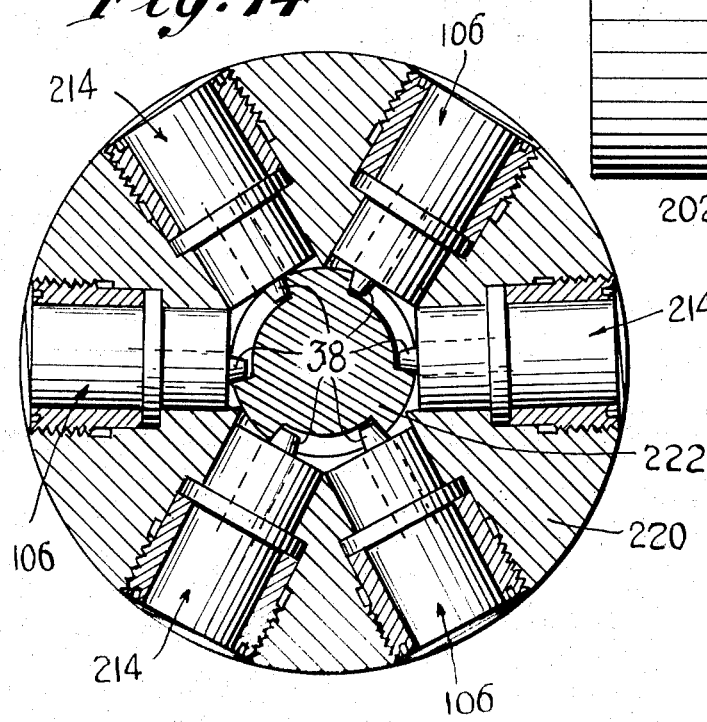
FIG. 14 is a sectional view of a slide bearing similar to that of FIG. 12, involving a splined bar having three longitudinally extending grooves.

FIG. 14 illustrates a modified slide bearing 220 for a splined shaft 222 having three grooves, the walls of each groove being engaged by two rollers respectively mounted in concentric bushing assemblages 214 and one roller mounted on an eccentric assemblage 106. The adjustment of the three eccentric bushing assemblages can be readily made in the manner mentioned above to virtually eliminate slop or play between the splined shaft and the bearing.

From the above it can be seen that I have provided a novel and improved anti-friction transmission which is simple in construction, and is easily serviced and maintained, yet which permits a high degree of flexibility to be obtained. The invention has the advantage of compensating for variations in the thread pitch of different screws, and also has the additional feature of enabling backlash to be reduced virtually to zero. The adjustment is simple and foolproof. The mechanism of the present invention thus represents a distinct advance and improvement in the mechanical transmission art.

Variations and modifications are possible without departing from the spirit of the invention.

I claim:

1. An anti-friction transmission mechanism engageable and cooperable with projections of a shouldered part, comprising in combination:
   a. a support member having an annular portion adapted to extend along the projections of said shouldered part in spaced relation thereto,
   b. a roller element projecting from the annular portion of the support member and arranged for engagement with side surfaces of the projections of said part,
   c. an additional roller element spaced from the first and projecting from the annular portion of the support member and arranged for engagement with side surfaces of the projections of said part,
   d. anti-friction bearing devices carrying said roller elements in substantially radial disposition with respect to said annular portion, and
   e. means for adjustably mounting said additional roller element on said member to enable adjustable positioning of the element axially of said member whereby the position of the additional roller element can be adjustably shifted with respect to said first roller element to enable precise and simultaneous engagement of both roller elements with the respective side surfaces of said shouldered part so as to enable said member to be used with shouldered parts made to non-critical tolerances.

2. The invention as in claim 1, wherein:
   a. said support member has means defining a socket radially disposed therein, and
   b. said adjustable means comprising an eccentric bushing, the bore of which is eccentric with respect to the outer periphery, said bushing being receivable in said socket and turnable therein,
   c. said bushing carrying one of said anti-friction bearing devices and said additional roller element.

3. The invention as in claim 2, and further including:
   a. means carried by said support member, for locking said bushing in different adjusted positions in said socket.

4. The invention as in claim 3, wherein:
   a. said annular portion has a tapped bore communicating with said socket, and
   b. said locking means comprises a set screw carried in said bore and engageable with the exterior surface of said bushing.

5. The invention as in claim 3, wherein:
   a. said bushing has an external annular shoulder,
   b. said socket having a corresponding annular shoulder adapted to abut against one surface of said bushing shoulder,
   c. said socket further having an annular recess adjacent to its shoulder,
   d. a spring washer adapted to abut against another surface of said bushing shoulder, and
   e. a split ring received in said recess and engaging the spring washer to thereby bias the bushing shoulder into engagement with the socket shoulder and thus retain the bushing against removal from the socket.

6. The invention as in claim 3, wherein:
   a. said bushing has an external annular shoulder,
   b. said socket having a corresponding annular shoulder adapted to abut against one surface of said bushing shoulder,
   c. said annular portion of the support member having a tapped bore communicating with said socket, and
   d. said locking means comprising a set screw carried in said bore and engageable with the lateral surface of said bushing.

7. The invention as in claim 3, wherein:
   a. said bushing has keying means engageable by a tool for effecting rotation thereof, to facilitate adjustment of the position of said one roller element.

8. The invention as in claim 2, wherein:
   a. said support member has means defining a second socket radially disposed therein,
   b. said mounting means comprising an additional bushing adapted to be received in said second socket, c. said bushing carrying the other of said anti-friction bearing devices and the first-mentioned roller element, d. said additional bushing and said first-mentioned roller element being concentric with one another.

9. The invention as in claim 3, wherein:

a. said bushing has an external annular shoulder, b. said socket having a corresponding annular shoulder adapted to abut against one surface of said bushing shoulder c. said socket having an internally threaded portion, d. a screw having a hollow portion for receiving said eccentric bushing and having an annular end portion, e. said screw being receivable in said threaded portion, and f. the annular end portion of the screw engaging the annular shoulder of the bushing, whereby the latter can be clamped between the socket shoulder and the end portion of the screw when the screw is tightened.

10. The invention as in claim 9, wherein:

a. said bushing has keying means engageable by a tool for turning it, and b. said screw having an access opening communicating with said hollow cup portion, so as to admit a tool to engage the keying means to adjustably turn the bushing.

11. The invention as in claim 3, wherein:

a. said support member has a longitudinal bore to receive said shouldered part, b. said bushing having an external annular shoulder, c. said socket having a corresponding annular shoulder adapted to abut against said bushing shoulder, d. said bushing being insertable in said socket from said longitudinal bore, and e. an annular centralizing ring disposed within said bore for centralizing said shouldered part therein.

12. The invention as in claim 1, wherein:

a. said support member has annular end portions, and b. a centralizing ring disposed at an end portion for centralizing the shouldered part in said member.

13. The invention as in claim 2, wherein:

a. said bushing has an inturned inner end to retain said one bearing device and said additional roller element.

14. The invention as in claim 2, wherein:

a. said bushing carrying one of said anti-friction bearing devices and said additional roller element constituting a unitary assemblage insertable in said socket as a unit, b. positioning means to limit the insertion of said assemblage to a predetermined amount, and c. retainer means to hold captive the assemblage.

15. The invention as in claim 14, and further including:

a. means carried by said member for locking said assemblage in different adjusted positions.

16. The invention as set forth in claim 1, and further including:

a. a shaft having a longitudinal groove, constituting said shouldered part, b. said roller elements engaging side walls of said groove, c. said side walls constituting the said projections of said shouldered part.

17. The invention as set forth in claim 16, wherein:

a. said shaft has additional longitudinally extending grooves with side wall portions constituting other projections of said shouldered part, and b. additional roller elements carried by said support member, engaging the side walls of said additional grooves so as to more adequately carry the support member on the shaft.

* * * * *